(12) United States Patent
Bolisetty et al.

(10) Patent No.: US 11,091,375 B2
(45) Date of Patent: Aug. 17, 2021

(54) HEAVY METAL RECYCLING PROCESS AND MATERIAL USEFUL IN SUCH PROCESS

(71) Applicant: ETH ZURICH, Zurich (CH)

(72) Inventors: Sreenath Bolisetty, Zurich (CH); Raffaele Mezzenga, Volketswil (CH)

(73) Assignee: ETH ZURICH, Zurich (CH)

( * ) Notice: Subject to any disclaimer, the term of this patent is extended or adjusted under 35 U.S.C. 154(b) by 547 days.

(21) Appl. No.: 15/126,912

(22) PCT Filed: Mar. 13, 2015

(86) PCT No.: PCT/EP2015/055323
§ 371 (c)(1),
(2) Date: Sep. 16, 2016

(87) PCT Pub. No.: WO2015/140074
PCT Pub. Date: Sep. 24, 2015

(65) Prior Publication Data
US 2017/0096349 A1    Apr. 6, 2017

(30) Foreign Application Priority Data

Mar. 17, 2014   (EP) ..................................... 14000983
May 19, 2014   (EP) ..................................... 14168815

(51) Int. Cl.
*B01D 39/20*   (2006.01)
*B01D 39/02*   (2006.01)
(Continued)

(52) U.S. Cl.
CPC .............. *C02F 1/288* (2013.01); *B01D 39/02* (2013.01); *B01D 39/14* (2013.01);
(Continued)

(58) Field of Classification Search
CPC .......... C02F 1/288; C02F 1/283; C02F 1/285; C02F 2101/10; C02F 2101/20;
(Continued)

(56) References Cited

U.S. PATENT DOCUMENTS 3,989,812 A    11/1976   Barrett et al.
4,257,807 A    3/1981    Drobot
(Continued)

FOREIGN PATENT DOCUMENTS

CL    200103161    12/2001
CN    1464189 A    12/2003
(Continued)

OTHER PUBLICATIONS

Do, The Preparation of Active Carbons From Coal By Chemical and Physical Activation, Oct. 10, 1995, p. 1 (Year: 1995).*
(Continued)

*Primary Examiner* — Bobby Ramdhanie
*Assistant Examiner* — Donovan Bui-Huynh
(74) *Attorney, Agent, or Firm* — Nyemaster Goode, P.C.

(57) ABSTRACT

The present invention relates to the field of water treatment/metal recovery and to materials/devices useful in such processes. Specifically the invention provides for composite materials comprising amyloid fibrils; activated carbon; optionally a support material; whereby said amyloid fibrils and said activated carbon are in intimate contact. The invention further provides for the treatment of water using such composite materials.

20 Claims, 1 Drawing Sheet

Figure 1:
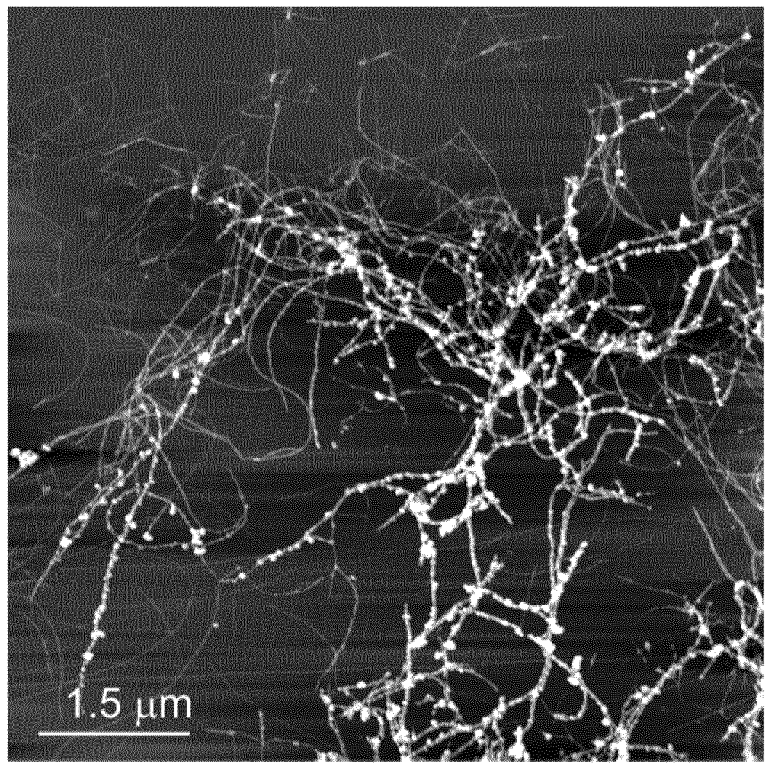

(51) Int. Cl.
*B01D 39/14* (2006.01)
*C02F 1/28* (2006.01)
*C02F 101/10* (2006.01)
*C02F 101/20* (2006.01)

(52) U.S. Cl.
CPC .......... *B01D 39/2058* (2013.01); *C02F 1/283* (2013.01); *C02F 1/285* (2013.01); *B01D 2239/086* (2013.01); *C02F 2101/10* (2013.01); *C02F 2101/20* (2013.01)

(58) Field of Classification Search
CPC ...... C02F 1/281; C02F 1/50; C02F 2201/006; B01D 2239/086; B01D 39/2058; B01D 39/2065; B01D 15/00; B01D 2239/0442; B01D 2239/0471; B01D 2239/0485; B01D 2239/0613; B01D 2239/0618; B01D 2239/065; B01D 2239/10; B01D 2239/1216; B01D 2239/125; B01D 2239/1291; B01D 2253/102; B01D 2253/202; B01D 2253/25; B01D 2253/34; B01D 2258/012; B01D 39/02; B01D 39/04; B01D 39/14; B01D 39/1623; B01D 39/2055; B01D 39/2062; B01D 53/02; B01D 53/0407; B01D 53/0415; A61L 27/34; A61L 15/32; A61L 24/0089; A61L 24/108; A61L 27/227; A61L 27/446; C08L 89/00; C08L 99/00; A61K 33/44; A61K 31/00; A61M 1/3679; A61P 13/12; A61P 1/16; A61P 25/28; A61P 31/12; A61P 39/02; B01J 20/20; B01J 20/28023; B01J 20/2803; B01J 13/043; B01J 20/0233; B01J 20/28004; B01J 20/28016; B01J 20/28042; B01J 20/2808; B01J 20/28083; B01J 20/3042; B01J 20/3078; B01J 20/3204; B01J 20/321; B01J 20/3212; B01J 20/3219; B01J 20/3236; B01J 20/3268; B01J 20/3274; B01J 2220/42; B01J 2220/66; C01B 32/382; C07K 16/065; C07K 16/2803; C07K 16/2812; C07K 17/06; C07K 2317/622; C08H 1/00; C09D 189/00; C09D 5/14; C09J 189/00; C09K 3/10; F01N 13/16; F01N 2330/10; F01N 2330/12; F01N 2330/18; F01N 2330/20; F01N 2330/42; F01N 2450/30; F01N 3/0226; G01N 2333/4709; G01N 2800/2821; G01N 33/54353; G01N 33/6857; Y02T 10/12; Y02T 10/20

See application file for complete search history.

(56) References Cited

U.S. PATENT DOCUMENTS

| 2005/0279696 | A1* | 12/2005 | Bahm | B01D 39/04 210/446 |
| 2007/0266892 | A1* | 11/2007 | Jarvis | A61K 31/00 106/124.4 |
| 2013/0125748 | A1* | 5/2013 | Taylor | B01D 53/0407 95/90 |

FOREIGN PATENT DOCUMENTS

| CN | 1639061 A | 7/2005 |
| CN | 101160169 A | 4/2008 |
| GB | 1360403 A | 7/1974 |
| JP | 51-43994 A | 4/1976 |
| WO | 2003009939 A1 | 2/2003 |
| WO | 2003064330 A1 | 8/2003 |
| WO | 2003066522 A1 | 8/2003 |
| WO | 2006045103 A2 | 4/2006 |
| WO | 2006110632 A2 | 10/2006 |
| WO | 2007105190 A2 | 9/2007 |

OTHER PUBLICATIONS

Serpell, Alzheimer's amyloid ¢brils: structure and assembly, Nov. 24, 1999, p. 1 (Year: 1999).*
Australian Patent Office, "Examination report No. 1 for standard patent application," issued in connection with Australian Patent Application No. 2015233679, dated Oct. 23, 2018, 2 pages.
African Regional Intellectual Property Organization (ARIPO), "Notification of Decision to Grant or Register and Search Report," issued in connection with ARIPO Patent Application No. AP/P/2016/009452, dated Aug. 1, 2018, 5 pages.
First Office Action in connection with Chinese Application No. 201580026089.1 dated Jan. 25, 2018, 7 pages with English translation.
Office Action in connection with Japanese Application No. 2016-557552 dated Nov. 6, 2018, 6 pages with English translation.
Office Action in connection with Chilean Application No. 2345-2016 dated Oct. 20, 2017, 7 pages.
Intellectual Property Office of Singapore, "Supplementary Examination Report," issued in connection with Singapore Application No. 11201607653P, dated May 6, 2017, 2 pages.
Office Action in connection with Eurasian Application No. 201691832 dated Nov. 9, 2017, 2 pages with English translation.
Office Action in connection with Eurasian Application No. 201691832 dated May 10, 2018, 2 pages with English translation.
International Searching Authority, "Search Report & Written Opinion," issued in connection with International Patent Application No. PCT/EP2015/055323, dated Sep. 24, 2015, 8 pages.
European Patent Office, "Extended European Search Report," issued in connection with European Patent Application No. 14168815.0, dated Jun. 10, 2015, 4 pages.
Australian Patent Office, "Examination report No. 3 for standard patent application", issued in connection with Australian Patent Application No. 2015233679, dated Oct. 4, 2019, 3 pages.
Intellectual Property India, "First Examination Report," issued in connection with Indian Patent Application 201617034935, dated May 20, 2019, 6 pages.
Australian Patent Office, "Examination report No. 2 for standard patent application", issued in connection with Australian Patent Application No. 2015233679, dated Aug. 5, 2019, 4 pages.
Indonesian Patent Office, "1st Office Action", issued in connection with Indonesian Patent Application No. P00201606199, dated Oct. 11, 2019, 2 pages.
Japanese Patent Office, "Notice of Reason of Rejection", issued in connection with Japanese Patent Application No. 2016-557552, dated Aug. 27, 2019, 3 pages.
Brazilian Patent Office, "Preliminary Office Action", issued in connection with Brazilian Patent Application No. BR112016021454-4, dated Jan. 14 2020, 4 pages.
Intellectual Property Office of the Philippines Bureau of Patents, "Substantive Examination Report", issued in connection with Philippines Patent Application No. 1/2016/501800, dated Feb. 5, 2020, 4 pages.
Canadian Intellectual Property Office, "Requisition by the Examiner", issued in connection with Canadian Patent Application No. 2,942,725, dated Feb. 19, 2020, 5 pages.

* cited by examiner

HEAVY METAL RECYCLING PROCESS AND MATERIAL USEFUL IN SUCH PROCESS

CROSS-REFERENCE TO RELATED APPLICATIONS

This application is a 371 National Phase Entry claiming priority to International Patent Application No. PCT/EP2015/055323, filed Mar. 13, 2015, entitled HEAVY METAL RECYCLING PROCESS AND MATERIAL USE-FULL IN SUCH PROCESS, which claims priority to European Patent Application No. 14168815.0, filed May 19, 2014 and European Patent Application No. 14000983.8, filed Mar. 17, 2014, all of which are incorporated herein by reference.

The present invention relates to the field of water treatment/metal recovery and to materials/devices useful in such processes.

Treatment of water, particularly recovery of metals from aqueous compositions comprising metal ions, is important in view of both, environmental and commercial purposes. The same applies to purifying of water. Numerous methods and devices addressing these issues are known.

Acey (WO2006/045103) describes devices and methods for removing heavy metals from contaminated samples with membranes comprising purified metallothionein proteins.

The process disclosed therein is considered disadvantageous as it requires obtaining metallothionein proteins by biotechnological methods (isolation, amplification and expression in transgenic tobacco), making the required devices difficult to produce and expensive. Further, recovery of metals from these sensitive devices is difficult.

Drobot (U.S. Pat. No. 4,257,807) describes process for recovering precious metals from aqueous media by contacting with blood meal. The process disclosed therein is considered disadvantageous as it requires long contacting times of blood meal and contaminated water and a further requires a multi-step treatment.

In consequence, the prior art either (i) suggests the use of very advanced materials, providing good separation results but difficulties in recovery and applicability of the process or (ii) suggests the use of simple materials, providing poor separation results and requiring multi-step processes.

Thus, it is an object of the present invention to mitigate at least some of these drawbacks of the state of the art. In particular, it is an aim of the present invention to provide processes for treatment of water and for recovery of metals form aqueous compositions, as well as materials and devices useful in such processes.

These objectives are achieved by the material as defined in claim 1 and a method as defined in claim 10. Further aspects of the invention are disclosed in the specification and independent claims, preferred embodiments are disclosed in the specification and the dependent claims.

The present invention will be described in more detail below, referring to the first and second aspect of the invention. The first aspect is directed to new materials, devices, their manufacturing and their uses. The second aspect is directed to methods for the treatment of water using such materials and devices. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

As used herein, the term "a," "an," "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense.

Figure 2:
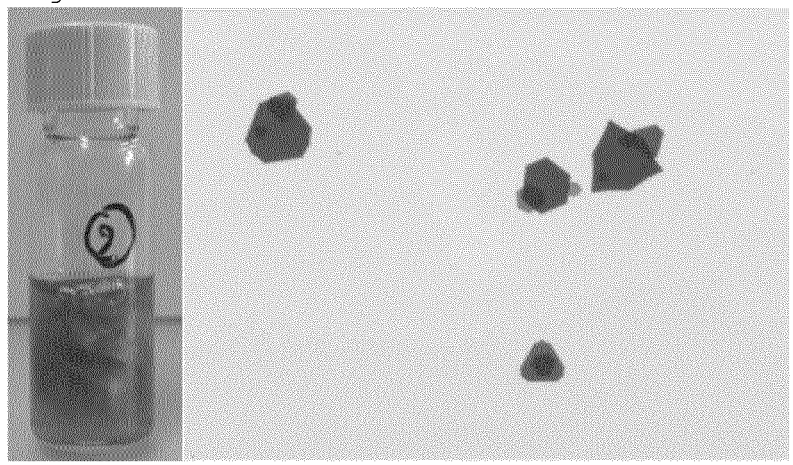

The present invention will be better understood by reference to the figures; wherein FIG. 1 shows an AFM image of gold nanoparticles produced according to the ex. 1, and their clusters dispersed in the fibril solution and FIG. 2 shows optical microscopy image of Au single crystals formed after heating @ 60° C., according to ex. 1.

In more general terms, in a first aspect, the invention provides for a composite material comprising (a) amyloid fibrils; (b) activated carbon; (c) optionally a support material; whereby said amyloid fibrils and said activated carbon are in intimate contact. This aspect of the invention shall be explained in further detail below:

It was surprisingly found that constituents (a) and (b) synergistically interact when treating waste water. The ratio of both constituents may vary over a broad range, depending on the specific material, the intended use and the device containing the composite material. Particularly good results are obtained, in case the ratio (a)/(b) is in the range of 1/1 to 1/100 (w/w).

Composite material: According to the invention constituents (a) and (b) are in intimate contact. The individual constituents remain separate and distinct within the finished structure but are thoroughly and randomly mixed. This is ensured by the manufacturing process. The material exhibits properties of both, amyloid fibrils and activated carbon, and is therefore also termed hybrid material. The support material may be a separate layer, e.g. in case of a filter membrane.

Amyloid fibrils: The term "amyloid fibrils" is generally known in the field and particularly describes fibrils made by proteins or peptides prevalently found in beta-sheet secondary structure. Accordingly, the term amyloid fibrils excludes native proteins.

Advantageously, the amyloid fibrils have high aspect ratio, preferably with ≤10 nm in diameter and ≥1 µm in length.

Advantageously, the amyloid fibrils have a highly charged surface. The term highly charged surfaces is generally known in the field and particularly describes surfaces showing electrophoretic mobilities of the order 2 µm·cm/V·s at pH 4.

Activated carbon: The term is known in the field and includes all commercial grades thereof. Suitable activated carbon may be produced from produced from carbonaceous source materials such as renewable sources (including nutshells, coconut husk, peat, wood, coir) but also conventional sources (including lignite, coal, and petroleum pitch). Suitable activated carbon may be produced by chemical activation or physical (gas) activation.

Support material: Support materials may or may not be present in the inventive composite material. For many applications, such support materials are preferred and may be selected from a broad range of known materials. The choice of support material depends on its intended use. Suitable are, for example porous support materials.

In certain applications, it is advantageous the support material being a carbonaceous material that readily oxidizes in a furnace, such as cellulose membranes.

In one advantageous embodiment, the invention relates to a composite material as described herein in the form of a filter membrane, said filter membrane comprising constituents (a), (b) and (c). Accordingly, the invention also provides for a filter device, comprising such composite material. Such filter may be any type of filter known in the field, typically surface filters including pressure- and vacuum-surface filters. In such filters, constituents (a) (b) are arranged upstream, while support material (c) is arranged downstream.

In one alternative embodiment, the invention relates to a composite material as described herein in the form of a particulate material. Typically the particle size of such material is in the range of 1 micrometre to 5 millimetres. Such particulate material comprises constituents (a) and (b), and may or may not comprise constituent (c); typically no supporting material (c). Such materials may be used in depth filters. Accordingly, the invention also provides for a filter device, comprising such composite material, typically depth filters.

Manufacturing: The inventive composites are simple in manufacturing, using starting materials readily available. This is considered a great advantage, as it allows for single use. The invention thus provides for a method for manufacturing a composite material as described herein, said method comprising the steps of (a) combining water, amyloid fibrils and activated carbon to obtain a suspension; and (b) filtering said suspension through a porous support material. The manufacturing may take place at room temperature, or at slightly elevated temperatures. Typically, an aqueous suspension of amyloid fibrils is provided first, activated carbon is added as a solid material while stirring. For certain application the thus obtained composite material may be directly used. Alternatively, the obtained composite material is filtered through a support material to obtain a composite material of constituents (a), (b) and (c).

The synthesis of amyloid fibrils is a known technology. Suitable is in particular protein hydrolysis followed by β-sheets driven fibrillation, as described e.g. in Jung et al. (Biomacromolecules. 2008, 9, 2477-2486). Suitable starting materials are food-grade proteins, which are structural stable, wide accessible and inexpensive. Such starting materials allow preparation of amyloid fibrils, such as β-lactoglobulin. Suitable proteins may be selected from the group consisting of β-lactoglobulin, lysozyme, ovalbumin, and serum albumines. The self-assembly process is facile and controllable. Typical process parameters include incubating protein solution (e.g. 2 wt. % β-lactoglobulin) for a prolonged period of time (e.g. 5 h) under acidic conditions (e.g. pH~2), low ionic strength (e.g. I≤20 mM), high temperature (e.g. T~90° C.).

Use: As outlined above, the composite materials are useful in the treatment of water. The invention thus provides for the use of a composite material or a filter as described herein, for the treatment of water (such as, for example reduction of metal content in said water), particularly for purification of water and/or for the recovery of metals from aqueous solutions. The composite materials are useful for treatment of both, municipal waste water and industrial waste water. It will be appreciated by the skilled person, and further outlined below, that the term "filtering" and "filtration" are used in a broad sense, particularly including removal of dissolved impurities from water or aqueous compositions. Such impurities include dissolved compounds of Au, Pd, Pt, Rh, Ru, Ir, Hg, as well as complex compounds such as $Au(CN)_4^-$. Typically, the reduction of impurities, such as dissolved metals is in the range of 95% or more.

In a second aspect, the invention relates to a method for the treatment of water (such as wastewater), said method comprising the step of contacting said water with a composite material comprising amyloid fibrils and activated carbon and separating the treated water from said amyloid fibrils. This aspect of the invention shall be explained in further detail below:

The term wastewater is known in the field and relates to water containing impurities. Accordingly, the term "treated water" relates to water containing a lower amount of said impurities. Wastewaters includes municipal waste water and industrial waste water. Industrial waste waters typically occur during manufacturing as a by-product and typically contain well-known impurities.

The term impurities, more generally unwanted materials, is known in the field, and particularly include metals. Metals may be present in oxidation +/−0 (i.e. elemental form, colloid) or in positive oxidation state (ie. in salt form or complexed with ligands). The method described herein is suitable for transition metals, lanthanoids, actinoids, metals of the $3^{rd}$, $4^{th}$, $5^{th}$ main group. The method described herein is particular suitable for metals having a positive standard potential, such as Cu, Ag, Au, Fe, Co, Ni, Ru, Rh, Pd, Re, Os, Ir, Cd, Hg; Pb particularly good results are obtained for Au, Pd, Pt, Hg, Pb.

Treatment of water particularly includes removal of impurities from wastewater and isolation of desired materials from aqueous compositions (solutions, suspensions, emulsions). By the inventive process, it is possible to remove (recycle) more than 95% of impurities by one single treatment cycle. The method as described herein has an extremely broad application spectrum and includes industrial water purification, metal mining, heavy metal recovery, pollution control and metal recycling. Impurities are significantly reduced by the present method, typically 200 fold, often more.

In one embodiment, the invention provides for the treatment of water, said method comprising the step of (a) providing a composite material according as defined herein and waste water; (b) contacting said waste water with said composite material, thereby obtaining purified water and loaded composite material; (c) separating the purified water from the loaded composite material.

In one further embodiment, the invention provides for method for recovering metals from an aqueous solution, said method comprising the steps of (a) providing a composite material as defined herein and an aqueous solution containing metal ions; (b) contacting said aqueous solution with the composite material thereby obtaining purified water and loaded composite material; (c) separating the purified water from the loaded composite material; and (d) oxidizing the loaded composite material in an high temperature environment to obtain elemental metals and ash; (e) separating the elemental metal from the ash.

The individual steps noted above are entirely conventional in the field—but not yet applied using the composite material as described herein and not yet applied to the wastewaters as discussed above. Advantageous embodiments of the above steps shall be further elucidated below.

In one embodiment, the composite material may be provided in the form of a filter and the waste water may be provided continuously. Step (b) and (c) may be performed simultaneously by filtering said waste water through said filter. As noted above, filtering also includes removal of dissolved impurities.

In one alternative embodiment, the composite material may be provided in the form of particulate material in step (a). In step (b) waste water and said composite material are contacted for a prolonged period, e.g. 20 sec-24 hrs., optionally with stirring. Optionally, the temperature is controlled, e.g. in a range from 5-95° C. In step (c) the obtained materials are separated by known methods, e.g. by filtering, centrifuging or settling. In this embodiment, steps (b) and (c) are optionally repeated.

In step (d) the oxidation may take place in a furnace, at temperatures suitable to allow oxidation of the fibrils, the support material (if present) and the reduction of the metal impurities. Suitable are temperatures in the range of 600-1200° C., such as 700° C. Suitable reaction times are in the range of 0.1-12 hrs., such as 3 hrs.

In step (e) the removed impurities may be separated from the impurities isolated. Any method suitable in this field, particularly methods for separating solid materials of different density and/or wettability, may be employed. In one embodiment, separation in step (e) is performed by floatation, optionally with the aid of ultrasound. In one alternative embodiment, separation in step (e) is performed by air floating, optionally with the aid of ultrasound.

The skilled person will appreciate that the method described herein provides significant advantages over the prior art: First, the method is economical, simple, safe robust and fast. Second, a scale-up is simple. Finally, the method may be fine-tuned by using several cycles, by adapting the composite material used and other parameters.

To further illustrate the invention, the following examples are provided. These examples are provided with no intend to limit the scope of the invention.

Example 1

Recovery of Au from $Au(CN)_4^-$ Solution 1.1 Preparation of Composite Material 0.5 g act. carbon are mixed with 0.5 ml of 2 wt % beta-lactoglobulin pH2 protein fibrils solution (see PCT/CH2014/000014) at room temperature. This solution is vacuum filtered using 0.22 micrometre cellulose filter membrane. Protein fibrils remarkable adhesiveness and stiffness enable the assembly of act. carbon into the fibrils. The thus obtained coated cellulose filter is used in the next step.

1.2 Contacting and Separating ("Filtering" $Au(CN)_4^-$)

50 ml industrial waste water, containing 30 mg/l Au (present as $Au(CN)_4^-$, determined by AAS) was filtered through the filter of step 1.1 using vacuum filtration. The purified water now contains, after a single passage through the filter, 0.105 mg/l Au (determined by the same AAS method). This corresponds to a reduction of 99.65% and shows the extremely high absorption rate of the inventive composite material.

1.3 Oxidizing of Loaded Composite Material

The loaded composite material is placed in a furnace for 3 hrs. @ 750° C. After cooling to room temperature, the sample colour changed from black to red. This indicates formation of nanoparticulate material. Activated carbon converted to ash.

1.4 Separating Elemental Gold

The material obtained from the previous step is mixed with distilled water and sonicated @ 100 Hz/15 min. Gold particles sediment on the bottom and the ash floated. The ash is removed and the sonicaton—removal cycle is repeated. The obtained particles contain elemental gold, as confirmed by AAS, and are virtually non-toxic and may be used for further applications.

1.5 Preparation of Conductive Gold Crystals

The material obtained from the previous step is combined with 0.2 wt % beta-lactoglobulin fibril solution, FIG. 1 shows an AFM image thereof. This material is combined with 0.01M chloroauric acid and heated to 60° C./12 hrs. to produce conductive gold single crystals. The thus obtained gold crystals have hexagonal, triangle and polyhedral structures, see FIG. 2.

Example 2

Recovery of Toxic Heavy Metal Pollutants 2.1 Preparation of Composite Material

Hybrid composite filter membranes are prepared to absorb the toxic heavy metal pollutants. Initially, 5 ml of 10 wt % activated carbon solution mixed with the 0.5 ml of 2 wt % β-lactoglobulin (pH 2) protein fibrils solution. 1 ml of above solution is vacuum filtered using 0.22 μm cellulose filter. Protein fibril's extreme adhesiveness and stiffness behavior enable the assembly of activated carbon into homogeneous composite filtration membrane. These filtration membranes are very useful to absorb heavy metal ion pollutants as well as recovery of the expensive heavy metals from the environmental pollutants.

2.2 Contacting and Separating

After preparing this composite filter membrane having the protein fibrils and activated carbon, the 50 ml of toxic heavy metal ion solution is passed through this composite membrane using vacuum filtration method.

The concentrations of the environmental pollutants were estimated before and after filtration to determine the absorption of toxic heavy metal ions inside the filter membrane.

The details of filtration and absorption efficiency of various toxic environmental pollutants within these hybrid filter membrane is discussed below 2.3 Results:

Mercury chloride solution (pH 4) was filtered. The AAS measurements estimated that the mercury atom concentration is reduced from initial 84 ppm to <0.4 ppm after filtration.

Lead acetate solution (pH 3.7) was also filtered and the concentration of the lead is calculated by AAS, before and after the filtration process. Since the concentration of lead solution before filtration is above than our available AAS calibration curve, the initial unfiltered solution is diluted 20 times for the measurement. The concentrations of lead atoms are reduced from 65 ppm to <0.02 ppm after filtration. A change of the solution color before and after filtration is observed. The solution became completely colorless because of absorption of lead atoms inside the filter membrane.

Disodium tetrachloro palladate was also filtered to show the generality of this filtration approach to prove the filtration of the heavy metal pollutant. The concentrations of the solutions are measured by UV-Vis absorption spectroscopy. The concentrations reduced from the 12.2 ppm to <0.16 ppm after filtration process.

Based on the above data, it was realized that the inventive method is generally applicable. Particularly, different types of heavy metal pollutants are filtered using the inventive composite material. Accordingly, the inventive method is suitable to absorb several heavy metal toxic environmental pollutants. Especially, potassium gold cyanide [$KAu(CN)_2$], mercuric chloride [$HgCl_2$], lead acetate [$Pb(C_2H_3O_2)_4$], disodium tetrachloro palladate [$Na_2PdCl_4$] may be efficiently removed and recovered.

The invention claimed is:

1. A water filtration material comprising:
   amyloid fibrils;
   activated carbon in particulate form; and wherein the amyloid fibrils and the activated carbon in particulate form remain separate and distinct and are randomly mixed with one another and wherein the water filtration material exhibits properties of both the amyloid fibrils and the activated carbon in particulate form and wherein the amyloid fibrils and the activated carbon in particulate form both treat water when water contacts the water filtration material.

2. The water filtration material of claim 1, wherein the water filtration material further comprises a support material.

3. The water filtration material of claim 2, wherein the amyloid fibrils and the activated carbon in particulate form are present in a ratio of amyloid fibrils/activated carbon in the range of 1/1 to 1/100 (w/w) and the support material is a porous support material that includes the amyloid fibrils and activated carbon in particulate form within the porous support material.

4. A method comprising the steps of:
contacting a waste water with a water filtration material comprising: amyloid fibrils; activated carbon in particulate form; wherein the amyloid fibrils and the activated carbon in particulate form remain separate and distinct and are randomly mixed with one another and wherein the water filtration material exhibits properties of both the amyloid fibrils and the activated carbon in particulate form and wherein the amyloid fibrils and the activated carbon in particulate form both treat water when water contacts the water filtration material, thereby obtaining purified water and a loaded water filtration material; and
separating the purified water from the loaded water filtration material.

5. The method of claim 4, the method wherein the waste water comprises elemental metals and the method further comprising the steps of: performing an oxidation/reduction reaction where the loaded water filtration material is in an environment having a temperature from 600° C. to 1200° C. for from about 0.1 to 12 hours to obtain elemental metals and ash; and
separating the elemental metals from the ash.

6. The method of claim 4, wherein
the water filtration material is a filter; and
the steps of contacting the waste water with the water filtration material and separating the purified water from the loaded water filtration material are performed by filtering the waste water through the filter.

7. The method of claim 4, wherein
the water filtration material is a blend of particulate material; and the waste water and the water filtration material are contacted for a period of 20 sec-24 hrs. at a temperature range from 5-95° C.; and
in the separating step materials are separated, by filtering, centrifuging or settling.

8. The method of claim 5, wherein
the oxidation/reduction reaction step (takes place in a furnace, at temperatures in the range of 600-1200° C.; and
the separating step separation is performed by floatation or air floating with the aid of ultrasound.

9. The water filtration material of claim 1, wherein the activated carbon in particulate form is activated carbon in particulate form obtained by chemical activation.

10. The water filtration material of claim 1, wherein the activated carbon in particulate form is activated carbon in particulate form obtained by physical activation.

11. The water filtration material of claim 9, wherein the water filtration material further comprises a support material that is a porous support material and the amyloid fibrils and the activated carbon in particulate form are within the porous support material.

12. The water filtration material of claim 1, wherein the water filtration material further comprises a porous support material.

13. A water filtration material comprising amyloid fibrils; activated carbon in particulate form; and a support material within a water filter; and wherein the amyloid fibrils and the activated carbon are randomly mixed with one another, in contact with each other, and synergistically interact when treating water that contacts the water filtration material to form treated water.

14. The water filtration material of claim 13, wherein the amyloid fibrils comprise fibrils being ≤10 nm in diameter and ≥1 µm in length.

15. The water filtration material of claim 14, wherein the amyloid fibrils and activated carbon in particulate form and the support material form a composite water filtration material.

16. The water filtration material of claim 14, wherein the ratio of amyloid fibrils to activated carbon in particulate form is in the range of from 1:1 to 1:100 (w/w).

17. The water filtration material of claim 13, wherein the amyloid fibrils and the activated carbon in particulate form are present in a ratio of amyloid fibrils to activated carbon in the range of from 1:1 to 1:100 (w/w).

18. A method comprising the steps of:
passing a waste water through a water filtration material comprising: amyloid fibrils; activated carbon in particulate form; a support material; and wherein the amyloid fibrils and the activated carbon in particulate form remain separate and distinct and are randomly mixed with one another and wherein the water filtration material exhibits properties of both the amyloid fibrils and the activated carbon in particulate form and wherein the amyloid fibrils and the activated carbon in particulate form both treat water when water contacts the water filtration material, thereby obtaining purified water.

19. The method of claim 18, wherein the waste water comprises one or more heavy metal pollutants and the water filtration material is loaded with heavy metal pollutants previously within the waste water after the waste water passes through the water filtration material.

20. The water filtration material of claim 10, wherein the water filtration material further comprises a support material that is a porous support material and the amyloid fibrils and the activated carbon in particulate form are within the porous support material.

\* \* \* \* \*